May 25, 1937.  G. CARLSON  2,081,321
MILEAGE INDICATOR FOR VEHICLES
Filed Aug. 27, 1936
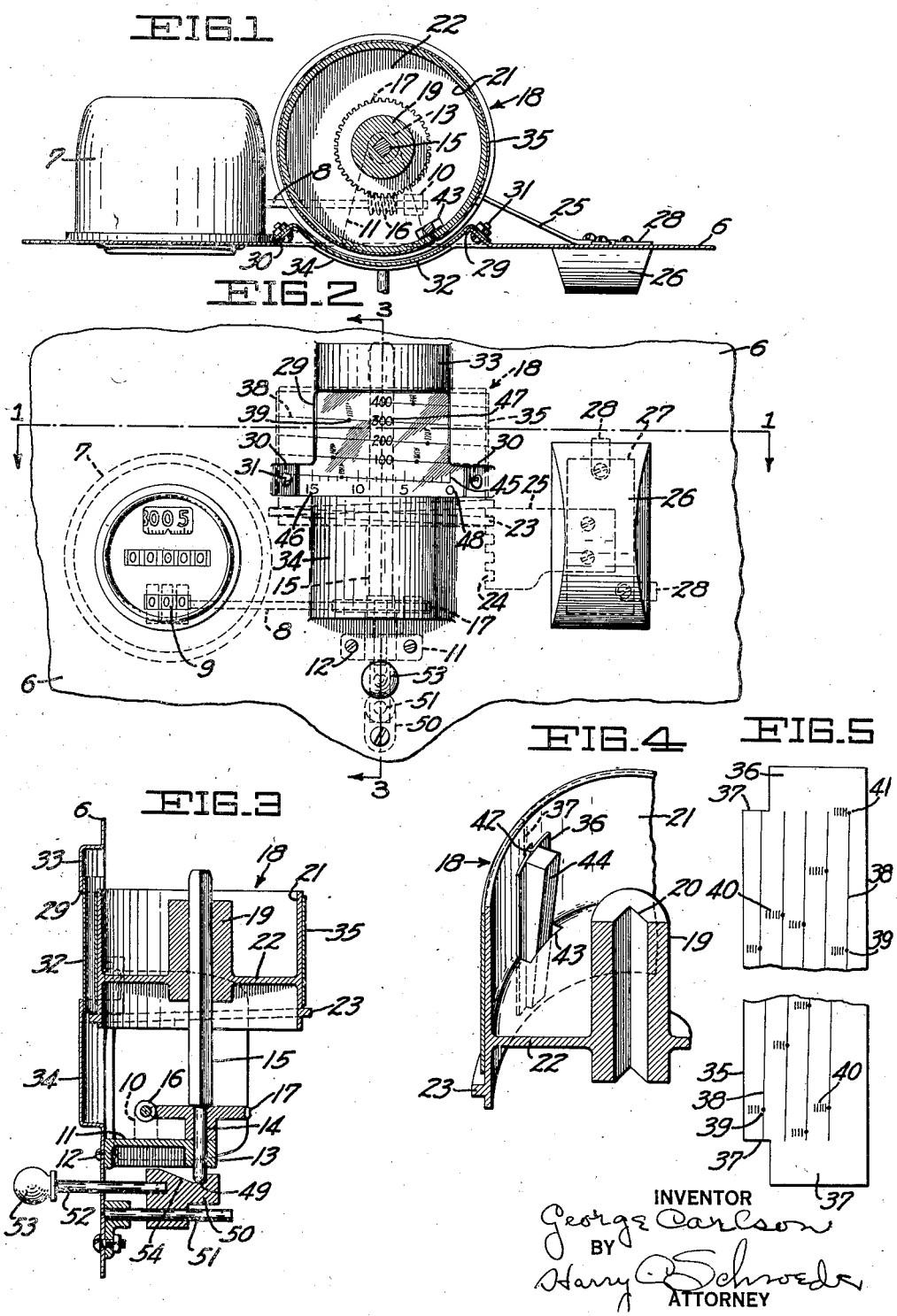
INVENTOR
George Carlson
BY
Harry G. Schroeder
ATTORNEY Patented May 25, 1937

2,081,321

UNITED STATES PATENT OFFICE 2,081,321

MILEAGE INDICATOR FOR VEHICLES

George Carlson, Richmond, Calif.

Application August 27, 1936, Serial No. 98,219

6 Claims. (Cl. 40—44)

This invention relates to devices to be used with vehicles for indicating the mileage travelled by the vehicle.

It is an object of the invention to provide a device which will indicate to the operator of the vehicle, at any instant during a trip to a given destination, the untravelled distance between the vehicle and the said destination.

Another object of the invention is to provide a device of the character described in which charts, pre-marked to indicate the distances between points along different routes, may be quickly interchanged.

A further object of the invention is to provide means for quickly resetting the device to the starting point.

Still another object of the invention is to provide means for rendering the indicator active or inactive at the option of the operator of the vehicle.

The invention possesses other objects and features of value some of which together with the foregoing, will be specifically set forth in the specification hereunto annexed. It is to be understood that the invention is not to be limited to the particular species thereof shown and described as various other embodiments thereof may be employed within the scope of the appended claims.

Referring to the drawing:

Figure 1 is a top plan view, partly in section, showing the mileage indicator of this invention mounted on the instrument panel of a vehicle. The plane in which the sectional portion of the view is taken is indicated by the line 1—1 of Figure 2.

Figure 2 is a front elevational view of the structure shown in Figure 1.

Figure 3 is a vertical sectional view of the indicator, the view being taken on the plane indicated by the line 3—3 of Figure 2.

Figure 4 is a fragmental perspective view of the indicator dial showing the method of attaching the chart thereto.

Figure 5 is a top plan view of one of the charts, a portion of the body of the latter being omitted to shorten the view.

In detail, the most desirable location in which to mount the indicator is on the instrument panel 6 of the vehicle closely adjacent the speedometer 7 which is geared, in the well-known manner, to be driven in synchronism with the rotation of the vehicle wheels, or the drive therefor.

The shaft 8 of the so-called "trip indicator" 9 is extended, as shown in Figures 1 and 2, the outer end thereof being journaled in a bearing 10 carried by a bracket 11 secured, by screws 12, to the panel 6. A bearing 13 is provided on the bracket 11 in which is journaled the lower cylindrical portion 14 of a vertical square shaft 15. Secured respectively to the shafts 8 and 14 is a worm 16 and a worm gear 17, meshing with the latter, so that the shafts are connected for synchronous rotation together. The worm gearing is preferably designed with a ratio of 100:1 although, as will appear later in the description, other multiples or fractions of this ratio may be used. The gear 17 is also capable of being moved, along the axis of the shaft 14, out of mesh with the worm 16, the purpose of which will be described later.

Mounted on the shaft 15 is a drum, generally indicated by the numeral 18, comprising a hub 19 having a square bore 20 therethrough, which slidably receives the shaft 15, and a cylindrical rim 21 which is secured to the hub by means of the web 22. Formed adjacent the lower end of the rim 21 is a single turn helical thread 23 which meshes with the teeth 24 formed along the vertical edge of a sheet metal bracket 25 attached to a block 26 which is removably secured in an aperture 27, formed in the instrument panel, by means of latch clips 28. The spacing of the teeth 24 corresponds with the pitch of the thread 23 and it will be observed that, when the vehicle is in motion, the rotation of the shaft 8, the latter being driven, as was stated above, by the speedometer, will cause rotation of the drum through the worm gearing and will also cause the drum, by the provision of the thread 23 and the teeth 24 of the fixed bracket 25, to be simultaneously advanced axially of the shaft 15.

Both the rotational and axial movements of the drum may be observed by the operator of the vehicle through a window provided in the instrument panel comprising an aperture 29 having at opposite sides thereof inturned flanges 30 to which is secured, by screws 31, a transparent sheet of material 32, preferably celluloid, shaped arcuately to overlie the periphery of the drum closely adjacent thereto. Arcuately shaped protrusions 33 and 34 of the panel are formed at each horizontal edge of the window to provide clearance for the drum during its axial movement.

Disposed on the periphery of the drum is the chart 35 shown in Figure 5 provided with narrowed end tabs 36 and proportioned as to length so that the distance between the shoulders 37 is equal to the periphery of the drum. The surface of the chart is provided with parallel lines 38 spaced apart a distance equivalent to the lead of the thread 23, and disposed in angular relation to the longitudinal edges of the chart, so that when the latter is placed upon the periphery of the drum, with the shoulders 37 abutting, the lines 38 will form a helix as is clearly shown in Figure 2. Each chart is provided with markings 39, having identifying captions 40, spaced along the lines 38 from the starting or zero point 41. These markings represent towns, service stations, or points of interest along the route which the chart represents, and the markings are spaced in accordance with the rotational speed of the drum 18 and therefore the mileage between the various points along the route.

Means is provided for securing the chart to the drum. Formed in the drum flange 21 is a slot 42 communicating, as is shown in Figure 4, with an aperture 43 formed in the web 22. The tabs 36 at each end of the chart are passed through the slot 42, while the chart is tightly held in contact with the drum periphery, the protruding ends of the tabs bent in opposite directions to overlie the inner surface of the flange 21 and a wedge-shaped key 44 inserted in the aperture 43 and pressed downwardly whereupon the tabs will be securely clamped between the key and the flange. The aperture 43 is made sufficiently wide so that clearance for the oppositely bent tabs is afforded.

Means is provided on the window 32 for evaluating, in terms of mileage, the spacing between the markings 39 of the chart. Disposed along the lower edge of the window are spaced graduations 45 having evaluating numerals 46, and arranged in the central area of the window are spaced numerals 47 which register with the spaced lines 38 of the chart. It will be observed that as the drum rotates, in a counter-clockwise direction as viewed in Figure 1 and from left to right in Figure 2, when the vehicle is in motion, the markings will pass across the numerals 47 and the graduations 46 toward the zero point 48. Figure 2 indicates the setup of the apparatus at the start of trip along a route, the chart for which has been mounted on the drum. It will be seen that the marking on the lowest line 38 indicates that the first town which will be reached along the route is located approximately 11½ miles from the starting point. As the vehicle proceeds the drum will rotate in synchronism with the road speed thereof and the marking will gradually approach the zero point until, when the town is reached, the marking and zero point will coincide, whereupon the next marking to the left of the zero point will indicate the mileage to be covered to reach the next town along the route. The numerals 47 serve to acquaint the operator with the distance between the vehicle and towns a considerable distance away. For instance, the marking appearing to the right of the numeral 100, on the second line 38 from the bottom, indicates, by reading downwardly to the graduations 45, that the vehicle is approximately 104 miles from the town, while the next marking on the same line, to the left of the numeral 100, indicates that the distance to this particular town is about 112½ miles.

Means is provided for rendering the indicator inactive at the option of the vehicle operator. This provision is important since it will be observed that, while the device will accurately inform the driver of the relative distances between the various points along the route, as long as the route is strictly adhered to, any deviation of considerable distances from the route would cause the indicator, when the trip along the chosen route is again resumed, to give erroneous readings. It is to prevent these discrepancies that the device may be rendered inactive when the driver is desirous of making side trips from the main highway. As was stated above the worm gear 17 may be moved out of mesh with the worm 16 so as to break the connection between the drum 18 and the speedometer from whence it derives its motive power. As will be seen in Figure 3, the lower end of the shaft 14 is rounded and rests on the ledge 49 of a cam block 50 which is slidably mounted on a pin 51 secured to the instrument panel 6. A shaft 52, secured at its inner end to the cam block, extends through the panel 6 and is provided at its other end with a knob 53. The cam block is also provided with a sloping cam surface 54 which, when the knob 53 is pushed inwardly against the panel, raises the shaft 14 axially upwardly to move the gear 17 out of engagement with the worm 16. Withdrawal of the knob 53 will allow the shaft and gear to descend by gravity to their normal positions wherein the gear is in mesh with the worm and indicator is active.

The drum may be removed, when it is necessary to change the chart mounted thereon for another, by removing the block 26, to disengage the teeth of the bracket 25 with the drum thread 23, and lifting the shaft 14 out of its bearing 13.

While, in the device just described, certain gear ratios and chart markings were given it is evident that these gears may be provided with any suitable ratio, and the chart markings made to conform to the ratio, without departing from the spirit of the invention.

I claim:

1. In a motor vehicle, a chart movable in synchronism with the movement of said vehicle, said chart having thereon a line arranged with a plurality of portions thereof in spaced relation and provided with spaced markings, a fixed graduated index extending parallel with one of said portions of said line for evaluating the spacing between said markings on said line, and separate fixed indicia registrable with each of the other portions of said line as said chart is moved for evaluating the spacing between the markings on said other portions of said line and those on the first-mentioned portion thereof.

2. In a motor vehicle, a device for indicating distances between points along a route travelled by said vehicle, comprising a drum having thereon markings corresponding to points along said route, a fixed graduated index, driving means for simultaneously rotating and axially moving said drum and the markings thereof past the graduations of said index in synchronism with the movement of said vehicle, and means for optionally rendering said driving means active or inactive.

3. In a motor vehicle, a device for indicating distances between points along a route travelled by said vehicle, comprising a drum having thereon markings corresponding to points along said route arranged along a helical path on the periphery thereof, a fixed graduated index, means for rotating said drum in synchronism with the movement of said vehicle, and means for maintaining said peripheral helical path of said drum in registry with said graduated index.

4. In a motor vehicle, a drive shaft driven in synchronism with the movement of said vehicle, a drum having thereon markings corresponding to points along a route to be traveled by said vehicle, a drum shaft connected with said drum, gearing normally connecting said drive and drum shafts for rotation together, a thread formed on said drum helically about the axis thereof, a toothed element engaged with said thread whereby, when said drum is rotated, said drum is moved axially, a fixed graduated index registrable with the markings of said drum as the latter is rotated and moved axially, means for disengaging said gearing to disconnect said shafts, and means for disengaging said toothed element from said thread.

5. In a motor vehicle, a drive shaft driven in synchronism with the movement of said vehicle, a drum shaft supported adjacent said drive shaft, gearing connecting said shafts for rotation together, a drum connected with said drum shaft and slidable axially thereof, a helical screw thread formed on the periphery of said drum, a fixed bracket having a toothed rack thereon in engagement with said drum thread whereby said drum, when rotated, will be moved axially along said drum shaft, a chart secured to and extending around said drum on the periphery thereof, said chart having a plurality of spaced lines thereon arranged helically about the axis of the drum and markings on said lines corresponding to points along the route to be travelled by said vehicle, a fixed transparent member disposed over a portion of the periphery of said drum having a plurality of spaced indicia thereon with which the markings of said chart are registrable as said drum is rotated and moved axially, and means for shifting said drum shaft axially to disengage the gearing connecting it with said drive shaft to stop the movement of said drum.

6. In a motor vehicle, a drive shaft driven in synchronism with the movement of said vehicle, a drum shaft supported adjacent said drive shaft, gearing connecting said shafts for rotation together, a drum connected with said drum shaft and slidable axially thereof, a helical screw thread formed on the periphery of said drum, a fixed bracket having a toothed rack thereon in engagement with said drum thread whereby said drum, when rotated, will be moved axially along said drum shaft, a chart secured to and extending around said drum on the periphery thereof, said chart having a plurality of spaced lines thereon arranged helically about the axis of the drum and markings on said lines corresponding to points along the route to be travelled by said vehicle, a fixed transparent member disposed over a portion of the periphery of said drum having a plurality of separate spaced indicia thereon with which the markings of said chart are registrable as said drum is rotated and moved axially, and means for shifting said drum shaft axially to disengage the gearing connecting it with said drive shaft to stop the movement of said drum, said means comprising a block slidably mounted transversely of and engaging an end of said drum shaft, said block having an inclined surface rising beyond the end of said shaft, and means for manually moving said block to move said inclined surface thereof across the end of said shaft to raise said shaft to the extent of said incline and thereby move one of the gears connecting said shafts out of mesh with another of said gears.

GEORGE CARLSON.